UNITED STATES PATENT OFFICE.

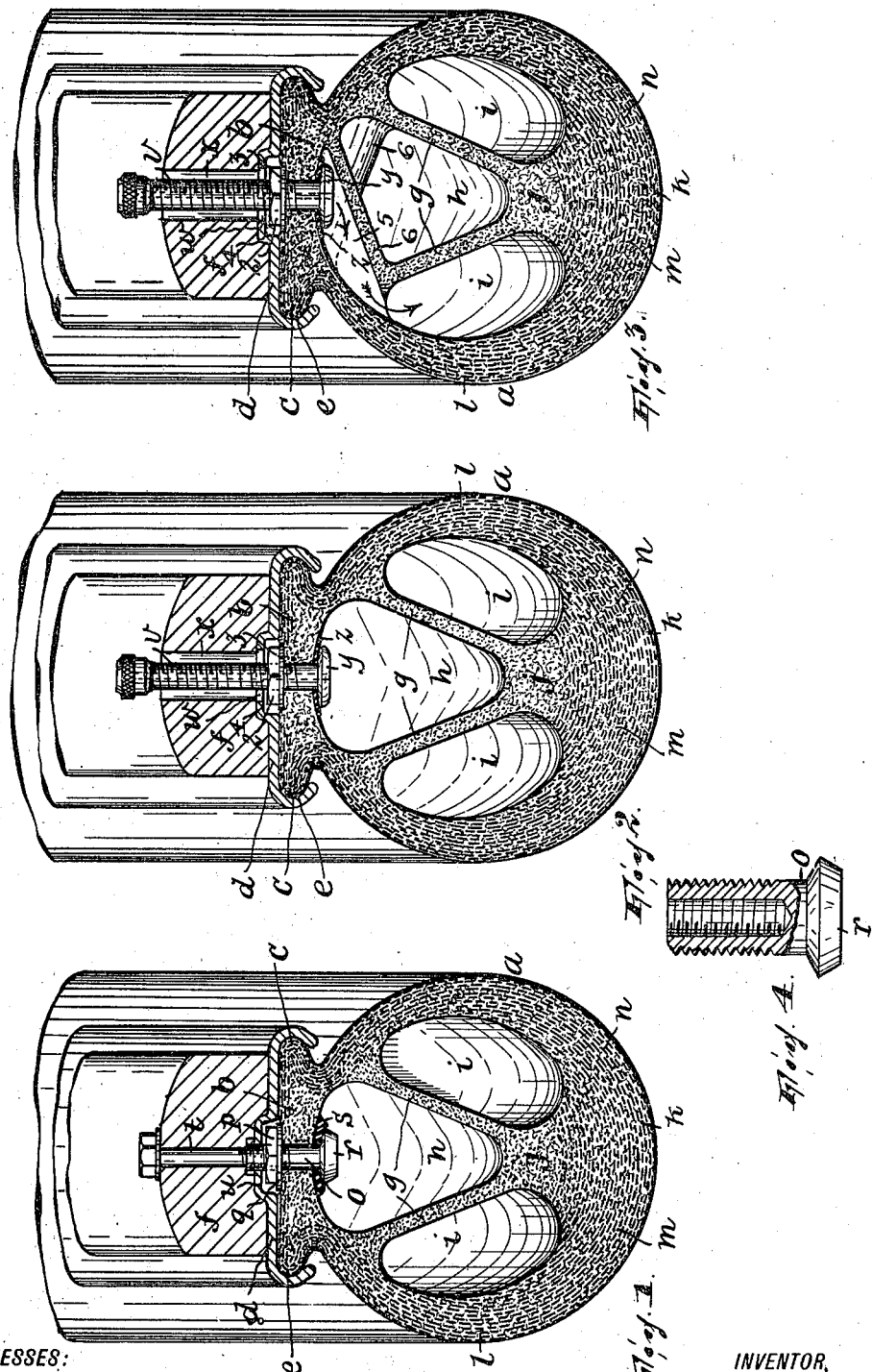

ANTONY T. SCARAMUZZI, OF PATERSON, NEW JERSEY, ASSIGNOR OF ONE-HALF TO PAUL SACCO, OF PATERSON, NEW JERSEY.

VEHICLE-WHEEL TIRE.

989,431. Specification of Letters Patent. Patented Apr. 11, 1911.

Application filed June 7, 1910. Serial No. 565,540.

*To all whom it may concern:*

Be it known that I, ANTONY T. SCARA-MUZZI, a citizen of the United States, residing in Paterson, Passaic county, New Jersey, have invented a certain new and useful Improvement in Vehicle-Wheel Tires; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to vehicle wheel tires and particularly to vehicle wheel tires of the cellular or hollow type.

The object of this invention is to provide a tire which may be readily applied to and removed from the wheel rim and when in place on the rim will be securely held thereto by any suitable locking means, among which may be mentioned those of the simpler or more conventional type.

A further object of the invention is so to construct a tire that if it takes the form of a pneumatic or inflated tire its construction will be such that the possibility of puncturing it will be considerably reduced and, although it may be punctured, the tire may still be continued in service, at least until it is convenient to repair the puncture.

Referring to the accompanying drawing, Figure 1 is a cross-sectional view of the improved tire and the felly and rim of a wheel, the section being taken in a plane coincident with one of the devices for securing the aforesaid three parts together, which means appears in elevation; Fig. 2 is a similar view taken in a plane coincident with one of the air valves which leads to the radially inward or intermediate cell of the improved tire, said air valve appearing in elevation; Fig. 3 is a similar view taken in a plane coincident with one of the air valves which leads to one of the lateral cells of the tire, said air valve appearing in elevation; and, Fig. 4 is a detail of a part of the means shown in Fig. 1.

The tire $a$ has the exterior form of a cylinder, except for the projection $b$ at its inner periphery, which projection, being formed with the lateral shoulders $c$, is adapted to seat in and interlock with the rim $d$, whose lateral edges are turned in to form channels $e$ receiving the shoulders $c$; the rim $d$ may be attached to the felly $f$ in any desired manner.

The tire is hollow, as shown, and it has the radially outwardly converging walls $g$ which divide the interior of the tire into the three cells $h$ and $i$, $i$, the cell $h$ being substantially triangular and interposed between the other two, $i$, $i$, which are substantially lobe-shaped. The cells $i$, $i$, extend radially outwardly farther than the cell $h$ and are spaced from each other at their outer ends, leaving a solid portion $j$ of the tire therebetween, which solid portion is vertically alined with the center line of the tread of the tire.

The tire is built up of rubber and duck (or any other suitable material which, when combined with the rubber in the manner customary in the manufacture of elastic tires, will contribute strength and durability without detracting from the elasticity of the tire) in preferably the following manner: The tread portion $k$ and the side walls $l$ of the tire are composed of alternating layers of rubber and duck ($m$ and $n$, respectively), which formation may, if desired, follow the outer contour of the tire, continuously, except at the middle part of its projection $b$, where it is interrupted; the rubber and duck formation also extends preferably part-way up into the portion $j$ of the tire. The remainder of the tire, to wit, the radially inward part of portion $j$, each of the walls $g$, and the intermediate portion of the projection $b$, is composed of rubber or a substance comprising rubber having greater elasticity than the tread and side walls of the tire.

In view of the construction, it will be seen that, while the superficial wall of the tire (which wall is cross-sectionally continuous) including its tread and side portions are retained durable and resistant to puncture and blow-outs the same as tires built up of rubber and duck or similar materials, the more elastic portions thereof permit internal pressure to act to expand the tire (while its cellular form is thereby preserved), the effect of which expansion will be mainly to force laterally the shoulders $c$, $c$, into locking engagement with the rim $d$. While, therefore, when the tire is deflated it may be applied to or removed from the rim with comparative ease, when it is inflated the internal pressure automatically insures its interlocking with the rim, and this makes it possible to employ some such simple or conventional type of rim as that shown in the drawing.

If desired, means for securing the tire to the felly and rim may be employed. To this end, in the drawing, o is a bolt which is passed through the radially inward portion of the tire, its head being inward and its threaded portion protruding and having screwed upon it the nut p which bears against a metal washer q, the head r of the bolt resting against an elastic washer s preventing leakage by way of the hole through which the bolt is passed. Passed through the felly and rim is a screw t which is tapped into the shank of the bolt o which is hollow and internally threaded for this purpose. To accommodate the nut p, the rim d may be recessed, as at u, as seen in Fig. 1.

The cells h and i, i are independent of each other in the preferred construction and each has independent valved means for inflating it. The construction of the three sets of valved means is the same, so a description of one will serve for the others. In Figs. 2 and 3 v is a valve tube of usual construction which is passed through the radially inward portion of the tire centrally thereof and through the holes w and x in the corresponding portions of the rim and felly. The inner end of this valve tube has a head y which bears against an elastic washer z serving to prevent leakage around the valve tube. The valve tube is exteriorly threaded, and onto it is screwed a nut 2 which bears against a washer 3 and thus coacts with the head y to exert the necessary pressure on the washer z. The rim may be recessed, as at 4, to receive the nut 2. The valve tube leading to the cell h enters the same directly. Each of the other two valve tubes enters the corresponding cells i, i, through the medium of the passages 5 which are formed by the arched walls 6 closing off the inner ends of the perspective air tubes from the intermediate cell h. Thus, if a puncture should cause the deflation of any one of the three cells, the other two would remain in service, since each is independent of the others.

It should be noted that the arrangement of the cells is such that while the tire has the desired elasticity or "life", the chances of its being punctured are much less than in the case of the ordinary tire, because in the line of the greatest wear its tread portion is thick, that is from the lower side of the cell h downwardly, the two cells i being sufficiently spaced so that the puncturing of either of them is generally not likely to occur.

Having thus fully described my invention, what I claim as new and desire to secure by Letters Patent is:

A pneumatic vehicle wheel tire having two cells arranged in spaced relation to each other in the cross-section of the tire and extending circumferentially thereof and a third cell arranged between the first two cells, in combination with three separate inflating means for the several cells all arranged substantially in the central vertical plane of the tire, one of said inflating means discharging into the third-named cell, and said tire having two walls forming each with the outer tire wall a passage, one of said passages connecting one of the two cells first-named with one, and the other of said passages connecting the other of the two cells first-named with the other, of the remaining two inflating means, substantially as described.

In testimony, that I claim the foregoing I have hereunto set my hand this 4th day of June 1910.

A. T. SCARAMUZZI.

Witnesses:
JOHN W. STEWARD,
WM. D. BELL.

---

Copies of this patent may be obtained for five cents each, by addressing the "Commissioner of Patents, Washington, D. C."